May 19, 1959 J. C. SETTLES 2,887,071
VIBRATION ABSORBER FOR VEHICLES
Filed Jan. 29, 1954 3 Sheets-Sheet 1
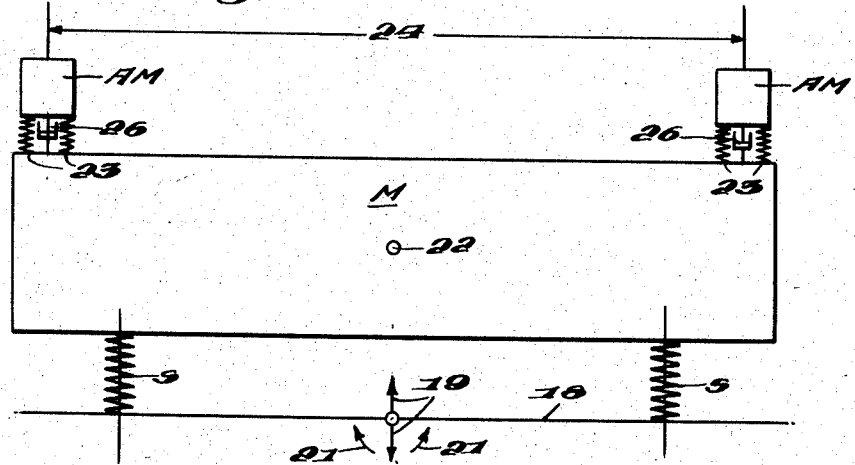
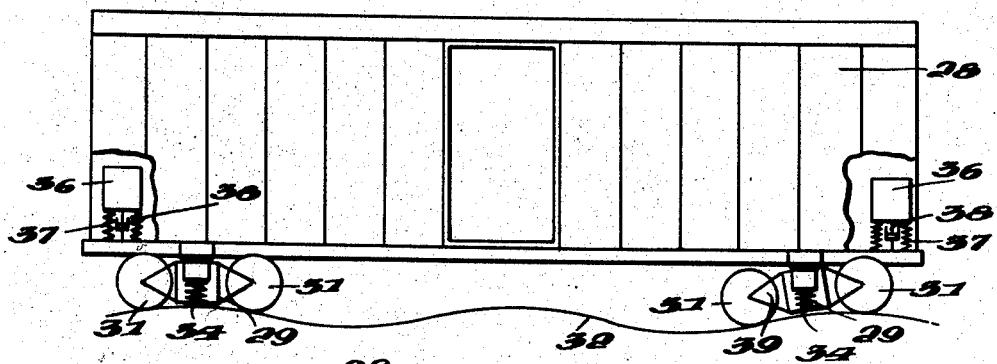
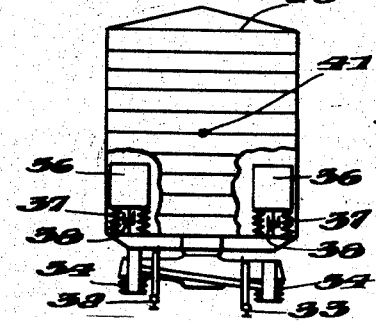
INVENTOR
JAMES C. SETTLES,
BY
ATTORNEY May 19, 1959 J. C. SETTLES 2,887,071
VIBRATION ABSORBER FOR VEHICLES
Filed Jan. 29, 1954 3 Sheets-Sheet 2
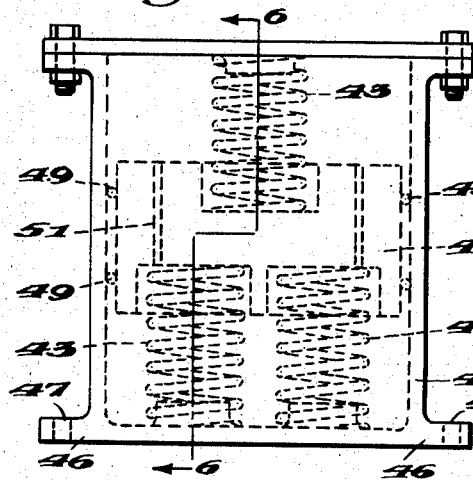
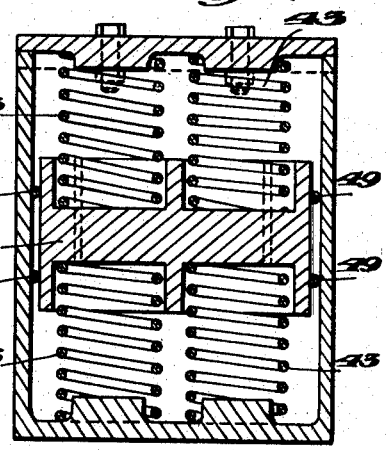
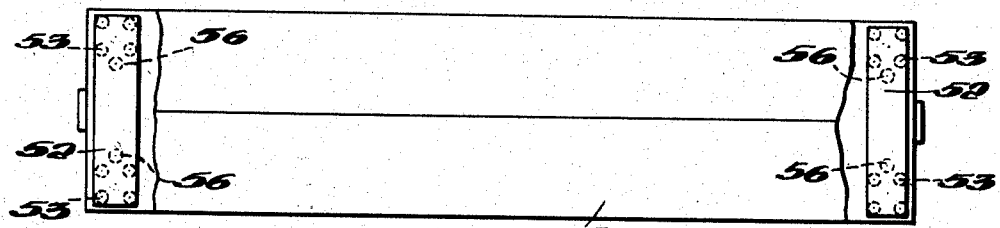
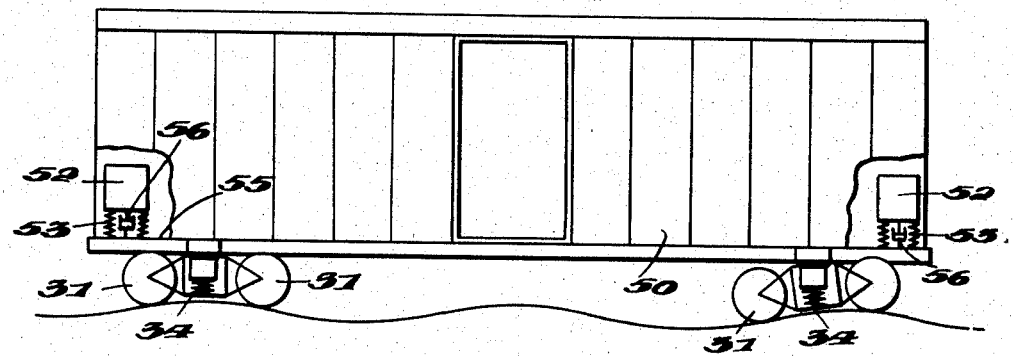
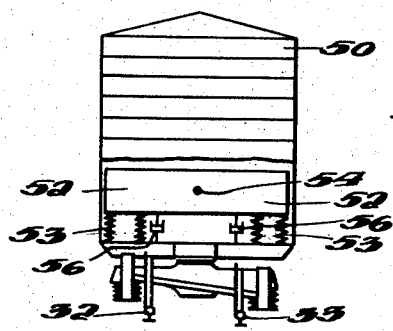
INVENTOR
JAMES C. SETTLES,
BY
ATTORNEY May 19, 1959  J. C. SETTLES  2,887,071
VIBRATION ABSORBER FOR VEHICLES
Filed Jan. 29, 1954  3 Sheets-Sheet 3
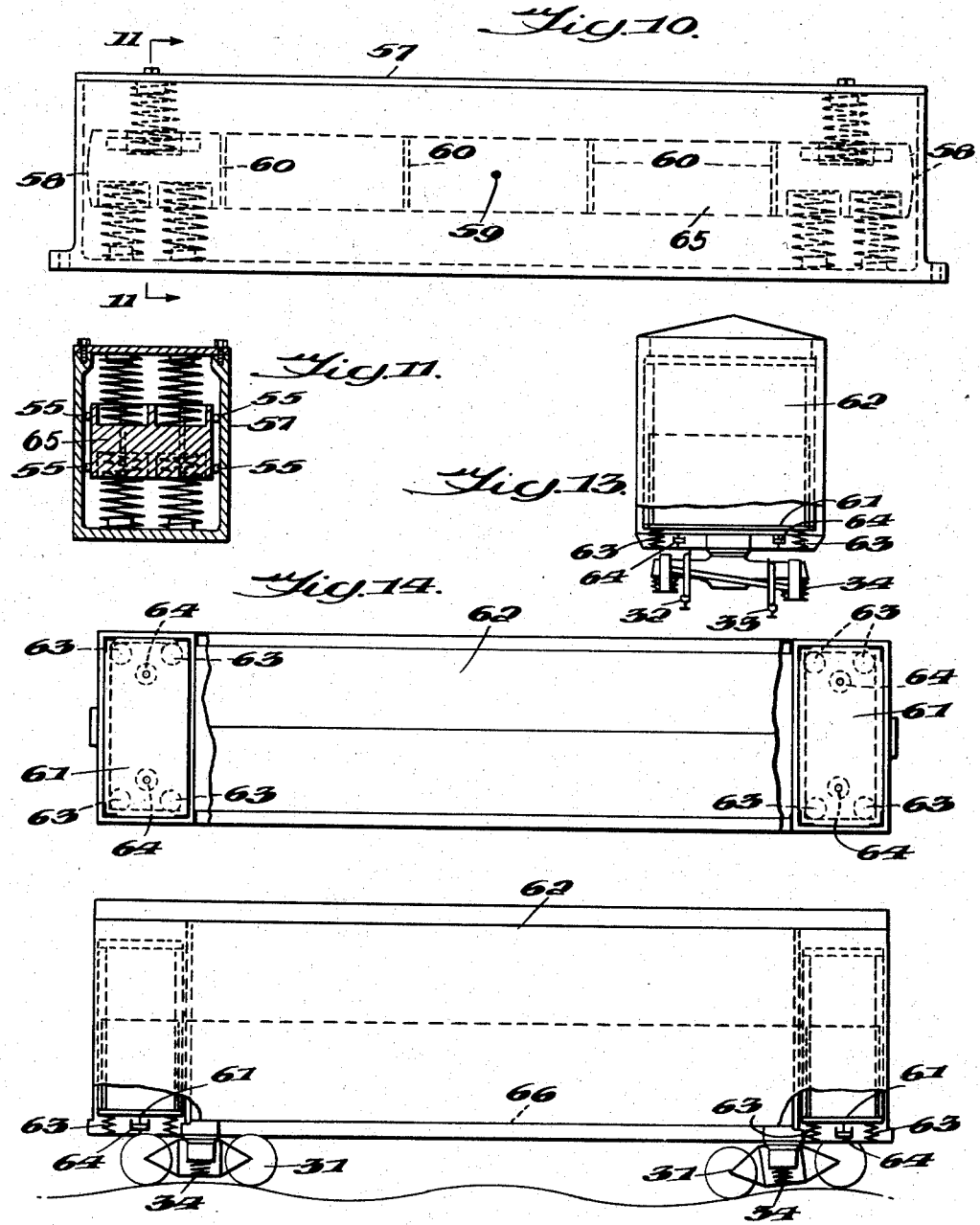
INVENTOR
JAMES C. SETTLES,
BY
ATTORNEY

United States Patent Office 2,887,071
Patented May 19, 1959

2,887,071

VIBRATION ABSORBER FOR VEHICLES

James C. Settles, Columbus, Ohio, assignor to The Buckeye Steel Castings Company, Columbus, Ohio Application January 29, 1954, Serial No. 406,971

17 Claims. (Cl. 105—392.5)

The present invention relates to dynamic vibration absorbers for annuling or minimizing movements of a mass which is subject to simultaneous excitation of more than one degree of freedom and the invention has particular utility in connection with vehicles wherein the body or load carrying portion is resiliently supported for movement on wheels and the vibration absorber serves to suppress vibrations of the load carrying structure of such vehicles as a result of certain periodic displacements or forcing amplitudes resulting from irregularities over which the wheels roll.

In vehicles of the type which include a main body mass which is spring supported and which rolls by means of wheels over a road bed surface of an undulating character there is a bouncing, pitching and rolling of the main mass. Such vibrations may become pronounced and excessive and it is an object of the invention to provide means for absorbing such vibrations to reduce motions of the main body mass.

A further object of the present invention is to provide means in association with a main mass for damping or substantially avoiding disturbing vibrations by resiliently supporting an auxiliary mass on or within the main mass whose vibrations are to be absorbed whereby the auxiliary mass is caused to vibrate by the forced excitation of the main mass and annul vibrations of the main mass.

Another object of the invention is to provide novel means for controlling the vibratory movements imparted to a vehicle body which is supported by springs near its ends and to provide means whereby the auxiliary mass can be varied with the main mass in order to maintain a constant relation between them.

Other objects and features of the invention will be apparent as the present disclosure proceeds and upon consideration of the following detailed description taken in connection with the accompanying drawings wherein several embodiments of dynamic absorber means are disclosed in association with vehicles of the railway type.

In the drawings:

Fig. 1 is a diagrammatic view illustrating the fundamental principle embodied in the present invention.

Fig. 2 is a side elevational view of a railway freight car exhibiting the invention.

Fig. 3 is an end view with portions broken away to illustrate location of the absorber masses.

Fig. 4 is a plan view.

Fig. 5 is a side elevation of a dynamic vibration absorber which may be used in the organization shown in Figs. 2 to 4.

Fig. 6 is a sectional view taken on the line 6—6 of Fig. 5.

Fig. 7 is a side elevational view of a railway freight car provided with a modified arrangement of the means providing the auxiliary masses.

Fig. 8 is an end view of the car shown in Fig. 7 with a portion of the car body broken away.

Fig. 9 is a plan view with portions of the car body broken away to illustrate the disposition of the auxiliary masses.

Fig. 10 is a side elevational view of a vibration absorber for use in the organization shown in Figs. 7 to 9.

Fig. 11 is a sectional view taken on the line 11—11 of Fig. 10.

Fig. 12 is a side elevational view of a railway freight car provided with means for resiliently supporting parts of the pay load to serve as the auxiliary masses.

Fig. 13 is an end view of the car shown in Fig. 12 with a portion broken away to illustrate one of the platforms on which a part of the load is supported.

Fig. 14 is a plan view with end portions of the car body broken away to illustrate the platforms at each end of the car body.

The principles on which the invention is based are illustrated in Fig. 1 wherein the main mass is indicated at M. This mass is supported near each end by load supporting springs S. The springs S at their lower ends engage a support represented by the line 18. If the load supporting springs S are subjected to vertical linear displacements as indicated by the double arrows 19 which periodically compresses and extends the lower ends of both of the springs S above and below the static height simultaneously in equal amount and in the same direction the main mass M takes up a periodic linear motion in a vertical plane in response to such excitation. Such movements of the main mass may be regarded as "bounce" which has the same frequency as the exciting displacement represented by the arrows 19 and which may become excessive unless some means of controlling the motion is provided.

If the lower portions of the load supporting springs S are subjected to rotational displacement indicated by the two curved arrows 21 which periodically compress and extend the lower end portions of both springs S above and below the static height simultaneously an equal amount and in opposite directions the main mass M takes up a periodic rotational motion in a vertical plane about a transverse horizontal axis 22. Such rotation movements of the main mass M may be regarded as "pitch." The forced rotation motion of the main mass M has the same frequency as the excitation represented by the arrows 21 and the rotation displacement may become excessive unless some means is provided for controlling such oscillations.

The organization shown in Fig. 1 represents a side view of a mass the vibrations of which are to be controlled wherein the springs S are spaced lengthwise of the main mass M. Fig. 1 may also be regarded as representing an end view of the main mass in which the springs S are spaced from each other in the direction of width of the main mass and the rotational forcing displacements indicated at 21 may be regarded as being applied in a transverse vertical plane. Under such circumstances the forced rotational motion of the main mass may be regarded as "roll."

One auxilitary mass AM is mounted by means of springs 23 near one end of the main mass M. Another auxiliary mass AM is mounted on the main mass M near the other end thereof by means of springs 23. The auxiliary masses AM are located in positions where in response to the three independently forced motions of the main mass M, namely, "bounce," "pitch" and "roll" the auxiliary masses AM take up periodic vertical linear motions of the same frequencies as the forcing excitations represented by the arrows 19 and 21 and effectively reduce the amplitudes of the three motions of the main mass M. In response to the bouncing motion of the mass M the auxiliary masses AM also bounce, both in the same direction simultaneously and resist bouncing of the main mass. In response to rotational motions of the main mass M the auxiliary masses AM move linearly with bouncing motion but in opposite directions and thereby resist the rotational motion of the main mass M. In this connection it is important to make the spacing 24 between the auxiliary masses AM as large as possible in order to provide effective control of the rotational motions of the main mass M. The total motion of the main mass and each absorber mass is the total of all of the separately forced and independent motions.

If the main mass M remains constant and if the frequencies of the linear and rotational forcing amplitudes 19 and 21 are alike and remain constant the springs 23 may be proportioned so that essentially all motion of the main mass M is eliminated at a particular given frequency. In equipment wherein either the main mass M or the forcing frequencies are subject to appreciable variations it is desirable and advantageous to provide damping of the springs 23. A fluid damping device of a conventional design such as diagrammatically represented at 26 may be mounted between each auxiliary mass AM and the main mass M which functions by means of a dash pot principle to provide viscous damping of the auxiliary masses and their spring systems.

Vehicles such as those which move on highways and railway vehicles include a body which is spring supported near each end and which rolls by means of wheels over a road bed or a road surface which is often of an undulating or wavy character and which serves to excite bouncing, pitching, and rolling of the load carrying body which constitutes the main mass. Trucks and freight cars which carry heavy loads present problems in controlling oscillatory movements of the load carrying body because of large variations in the main mass between unloaded and loaded conditions of the vehicle. In addition there are variations in the forcing frequencies as a result of different speeds at which such vehicles are moved.

The invention for purposes of illustration is described in connection with a freight car. Such a vehicle is shown in Figs. 2 to 4 and provided with a dynamic vibration absorber exhibiting the principles as referred to in connection with Fig. 1. The car body is represented at 28 provided with trucks 29 having railway wheels 31 for rolling on railway tracks 32 and 33. The rails of a railway track are of limited length and the joints of one track are staggered with reference to the adjacent track. The undulating character of one rail 32 is illustrated in an exaggerated condition in Fig. 2 and the horizontal displacement of the rails is illustrated in Fig. 3. Such a track is capable of producing linear and rotational forcing amplitudes at the lower ends of the load supporting springs 34 which resiliently support the body 28. These forcing amplitudes vary depending upon the relation of the spacing of the load supporting springs 34 to the length of the track undulations. An auxiliary mass 36 is mounted at each corner of the car body 28 on springs 37 which are damped by means of viscous dampers 38.

As a result of the fact that the undulations of one rail are often staggered with respect to the other rail "rolling" of the car body 28 may be excited by periodic changes of the levels of the two rails 32 and 33 at the opposite sides of the track. This action will be apparent from a consideration of Fig. 3 wherein one rail is lower than the other and the rolling motion of the main mass or car body 28 about the horizontal longitudinal axis 41 is induced. It will be noted from a consideration of Figs. 3 and 4 that the auxiliary masses 36 at each end of the car may consist of individual masses one in each corner of the car body having a mass equivalent to one-half of the auxiliary mass AM of Fig. 1 whereby the rolling motion of the car body 28 is resisted on each side by a total auxiliary mass supported on the springs 37 and damped by dash pot type dampers 38.

A structural arrangement for mounting the auxiliary mass within or on a railway freight car body is shown in Figs. 5 and 6 wherein the auxiliary mass is represented at 42 supported by springs 43 within a housing 44 filled with fluid. The springs 43 may be arranged partly above and partly below the mass 42 and placed under initial compression in order to properly accommodate motions of the mass 42 relative to the housing 44. The housing may be secured by any suitable means to the main car body by means of flanges 46 and the openings 47 therein. The mass 42 may be guided in its vertical movements relative to the housing 44 by means of rollers 49. The viscous damping of the mass 42 is obtained by forcing of the fluid through clearance between the member 42 and the housing as the mass moves therein. The amount of damping of the mass 42 may be controlled by varying this clearance or by the addition of ports 51 through which the fluid is forced during movement of the mass 42 relative to the housing. Vibration absorbers of the type as shown in Figs. 5 and 6 may be mounted on the floor of the car body 28 but it will be understood that they may be secured to the main mass in any convenient manner and in positions where they will not obstruct the floor space of the car body.

In the embodiment shown in Figs. 7 to 9 the absorbers and the mounting are such that the auxiliary mass consists of two members 52 which extend substantially entirely across the car body 50 near the ends thereof and are supported on the car body 50 by springs 53. Only one member 52 is required at each end of the car and its action in controlling bouncing and pitching motions of the car body is identical with the embodiments hereinabove described. The rolling motions of the car body 50 are controlled by rotational motion of the absorber about its transverse horizontal axis 54 shown in Fig. 8. In this modification spaced fluid dash-pot type dampers 56 may be provided in association with the spaced arrangements of the springs 53. The respective spacings of the dampers 56 and the spring arrangements 53 on each side of the center line of the auxiliary mass 52 are not necessarily the same and can be determined from the physical properties of the system so that optimum control of the rolling motion is obtained simultaneously with optimum control of the bouncing and the pitching motions of the main mass.

Figs. 10 and 11 illustrate an alternate arrangement of an absorber for the organization shown in Figs. 7 to 9. The mass may take the form of a member 65 of such length as to extend substantially throughout the transverse width of the car body and the member 65 is mounted within a housing 57. The mass is spring supported within the housing in a manner similar to the device described in connection with Figs. 5 and 6. The member 65 may be provided with convex shaped ends 58 so as to permit the mass to rotate about an axis 59 within the housing 57 without interference with the housing walls. If desired rollers 55 may be provided for guiding movements of the member 65 relative to the housing. The member 65 may be provided with ports 60 of various sizes to control the damping of the auxiliary mass within the housing 57.

There is a variation in the weight of the car body or the main mass in accordance with changes in the load carried by a railway car and such changes make it difficult to properly proportion the springing and damping of the constant mass absorbers hereinabove described so that effective control of the main mass motions is obtained for all loads and all speed conditions. Such difficulties result primarily from changes in the ratio of the auxiliary mass to the main mass with changes in the load. In the embodiment illustrated in Figs. 12 to 14 an organization is disclosed wherein the design of the absorber is such as to eliminate such undesiralbe characteristics by employing a portion of the lading or the pay load as the auxiliary mass. In this modification a predetermined proportion of the lading is carried on the absorber and the remainder of the load is supported on the floor 66 of the car body 62 in the usual manner in order to provide a constant ratio of the auxiliary mass to the main body mass under all load conditions.

As shown in Figs. 12 to 14 a platform 61 is provided at each end of the car body 62 and supported by spring arrangements 63 spaced transversely of the car. Spaced viscous damping devices 64 are provided in association with each platform 61. Any suitable means may be provided for securing a portion of the load on each platform 61 and for guiding the resulting auxiliary mass so that it is free to move as required without interference with the car body 62 and the load carried on the car floor 66. The weight of the empty platform 61 is such that a predetermined constant mass ratio exists for the empty car as well as for all loaded conditions. The springs 63 and the dampers 64 are designed and positioned to provide substantially equally effective reduction of the bounce, pitch, and roll motions of the main car body 62 and the load carried on the floor 66 for all loads and speed conditions.

It is desirable that the absorbers be mounted on the main mass in such a manner that they do not encroach seriously upon the clear floor space of a vehicle. An embodiment wherein four absorber masses are used in association with each vehicle is probably the most easily adapted to the body structure. The absorber masses may be located under the floor or incorporated in the corner design of the body. For designs in which the absorber masses are continuous across the width of the vehicle the absorber masses may be located at the extrame ends of the vehicle body and may be incorporated in the end structure. The absorbers disclosed herein can be used effectively on vehicles of many types and on some without increasing the weight to any great extent. This is particularly true for railway passenger cars. Heavy auxiliary equipment now carried on passenger cars can be used as dynamic vibration absorber masses without appreciably increasing the weight of the car. The passenger car has the further advantages of not being subject to large relative variations in load and can thus be controlled very effectively by the use of damped dynamic vibration absorbers for all load and speed conditions encountered in service.

While the invention has been described as being applied to railway cars it will be apparent that the invention may be applied to other vehicles or to vibrating systems which are subject to simultaneous excitation of more than one degree of freedom. The forcing need not be applied as an amplitude at the bottom of the main springs, but might originate on the main mass itself. The principles involved are not limited to the control of bounce, pitch, and roll but may be employed to control simultaneously endwise linear movement, sidewise linear movement, and rotation about a vertical axis (nosing) which three additional motions complete the six independent degrees of freedom of a free body. It will also be understood that the details of the construction of the absorbers and the means for mounting the auxiliary masses on the main mass may take various forms depending upon the particular system or vehicle to which the dynamic vibration absorber is to be applied. Such changes and others may be made without departing from the spirit and scope of the invention as set forth in the appended claims.

What I claim and desire to secure by Letters Patent is:

1. In a vehicle, a body constituting a main mass, wheels spaced lengthwise and transversely of said body including means and springs resiliently supporting the body for rolling movements over an irregular surface inducing said body to perform vibratory movements in more than one degree of freedom, dynamic vibration absorber means actuated by said vibratory movements comprising a plurality of independent weights each spring supported on said body at locations symmetrically spaced with respect to the center of gravity of said main mass.

2. In a vehicle, an elongated body constituting a main mass, wheels spaced lengthwise and transversely of the body including means resiliently supporting the body for rolling movements over an undulating surface inducing said body to perform vibratory movements in more than one degree of freedom, dynamic vibration absorber means actuated by said vibratory movements including auxiliary weights supported by springs on said body, and said springs being connected to said body at symmetrically spaced points about the center of gravity of the main mass.

3. In a vehicle, a body constituting a main mass of substantially rectangular design in plan, wheels including means and springs resiliently supporting the body as a symmetrical dynamic system for rolling movements over an irregular surface inducing said body to perform vibratory movements in more than one degree of freedom, an auxiliary mass spring supported on said body near each of the four corners of the main mass, and said auxiliary masses being actuated by the vibratory movements of the main mass to control movements of said body.

4. In a vehicle, a body constituting a main mass of generally rectangular shape in plan, wheels including means and springs resiliently supporting the body as a symmetrical dynamic system for rolling movements over an irregular surface inducing said body to perform vibratory movements in more than one degree of freedom, an auxiliary mass spring supported on said body near each of the four corners of the main mass, said auxiliary masses being actuated by said vibratory movements to control movements of said body, and damping means connecting each auxiliary mass to said body.

5. In a vehicle, a body constituting a main mass of elongated shape, wheels including means resiliently supporting said body as a symmetrical dynamic system for rolling movement over an irregular surface inducing said body to perform vibratory movements in more than one degree of freedom, an auxiliary mass extending transversely of the body near each end thereof, and spaced spring means supporting each auxiliary mass for free movements with respect to the body in response to said vibratory movements to control movements of the main mass.

6. In a vehicle, a body constituting a main mass of elongated shape, wheels including means resiliently supporting said body as a symmetrical dynamic system for rolling movement over an irregular surface inducing said body to perform vibratory movements in more than one degree of freedom, an auxiliary mass extending transversely of the body near each end thereof, spaced spring means supporting each auxiliary mass for free movements with respect to the body in response to said vibratory movements to control movements of the main mass, and damping means connecting each auxiliary mass to said body.

7. In a vehicle according to claim 5, wherein each auxiliary mass is encased in a liquid filled housing.

8. In a vehicle, a body adapted to carry a portion of a load and constituting a main mass, wheels including means resiliently supporting said body as a symmetrical dynamic system for rolling movement over an irregular surface inducing said body to perform vibratory movements in a plurality of degrees of freedom, means spring supported on said body at symmetrically spaced points about the center of gravity of the main mass each adapted to receive a predetermined portion of the load whereby said means and the portions of the load carried thereon control movements of the main mass.

9. In a vehicle, a body adapted to carry a portion of a load and constituting a main mass, wheels including means resiliently supporting said body as a symmetrical dynamic system for rolling movement over an irregular surface inducing said body to perform vibratory movements in a plurality of degrees of freedom, means spring supported on said body at symmetrically spaced points about the center of gravity of the main mass each adapted to receive a predetermined portion of the load whereby said means and the portions of the load carried thereon control movements of the main mass, and damping means connecting each means to said body.

10. In a vehicle, a body constituting a main mass, wheels including means resiliently supporting said body as a symmetrical dynamic system for rolling movement over an irregular surface inducing said body to perform vibratory movements in a plurality of degrees of freedom, a plurality of auxiliary masses spring supported on said body at symmetrically spaced points about the center of gravity of the main mass each having a predetermined mass with respect to said body whereby said auxiliary masses control movements of the main mass.

11. In a vehicle, a body constituting a main mass, wheels including means resiliently supporting said body as a symmetrical dynamic system for rolling movement over an irregular surface inducing said body to perform vibratory movements in a plurality of degrees of freedom, a plurality of auxiliary masses spring supported on said body at symmetrically spaced points about the center of gravity of the main mass each having a predetermined mass with respect to said body whereby said auxiliary masses control movements of the main mass, and damping means connecting each auxiliary mass to said body.

12. In a vehicle, a body including a floor adapted to receive a main portion of a load to be carried by the vehicle, wheels including means resiliently supporting said body and said load as a symmetrical dynamic system for rolling movement over an irregular surface inducing said body and said load to perform vibratory movements in more than one degree of freedom, a platform extending transversely of the body near each end thereof with each platform adapted to receive a predetermined portion of the entire load to be carried by the vehicle, springs supporting each platform for free movements with respect to the body whereby the platforms and the portions of the load carried thereon control movements of said body and the load carried on the floor thereof.

13. In a vehicle, a body including a floor adapted to receive a main portion of a load to be carried by the vehicle, wheels including means resiliently supporting said body and said load as a symmetrical dynamic system for rolling movement over an irregular surface inducing said body and said load to perform vibratory movements in more than one degree of freedom, a platform extending transversely of the body near each end thereof with each platform adapted to receive a predetermined portion of the entire load to be carried by the vehicle, springs supporting each platform for free movements with respect to the body whereby the platforms and the portions of the load carried thereon control movements of said body and the load carried on the floor thereof, and damping means connecting each platform to said body.

14. In a dynamic system, a resiliently supported main mass, means acting upon said main mass to produce forced vibrations in more than one degree of freedom, dynamic vibration absorber means resiliently supported on the main mass at a plurality of locations symmetrically disposed with respect to the center of gravity of the main mass whereby said absorber means takes up motions of the same frequency as the forcing means to control the amplitude of the motions of the main mass.

15. In a dynamic system, a resiliently supported main mass, means acting upon said main mass to produce forced vibrations in more than one degree of freedom, dynamic vibration absorber means resiliently supported on the main mass at a plurality of locations symmetrically disposed with respect to the center of gravity of the main mass whereby said absorber means takes up motions of the same frequency as the forcing means to control the amplitude of the motions of the main mass, and a plurality of damping means connected between said main mass and said absorber means at a plurality of locations symmetrically disposed with respect to the center of gravity of the said main mass.

16. In a dynamic system according to claim 15, wherein the main mass constitutes a major portion of the body of a vehicle and the dynamic vibration absorber means comprises load receiving platforms resiliently supported on said body.

17. In a vehicle acccording to claim 3, wherein each auxiliary mass is encased in a liquid filled housing.

References Cited in the file of this patent

UNITED STATES PATENTS

| | | |
|---|---|---|
| 989,958 | Frahm | Apr. 18, 1911 |
| 1,783,348 | Taylor | Dec. 2, 1930 |
| 1,867,708 | Paton | July 19, 1932 |
| 2,016,207 | Lindenberg | Oct. 1, 1935 |
| 2,038,603 | Rocke | Apr. 28, 1936 |
| 2,160,462 | Schieferstein | May 30, 1939 |
| 2,208,627 | Breer | July 23, 1940 |
| 2,586,043 | Hidgson et al. | Feb. 19, 1952 |
| 2,633,368 | Ross | Mar. 31, 1953 |